United States Patent [19]

Baumann

[11] Patent Number: 5,343,131
[45] Date of Patent: Aug. 30, 1994

[54] METHOD AND APPARATUS FOR SELF-SYNCHRONIZING SEEK DECELERATION

[75] Inventor: Todd D. Baumann, Berthoud, Colo.

[73] Assignee: Fujitsu Limited, Kanagawa, Japan

[21] Appl. No.: 9,773

[22] Filed: Jan. 27, 1993

[51] Int. Cl.⁵ ............................................. G05B 11/06
[52] U.S. Cl. .................... 318/561; 318/760; 318/369
[58] Field of Search ............... 363/43, 98; 318/560, 318/561, 60, 757, 760, 798, 273–278, 364, 369; 360/72.1, 72.2, 77.01, 77.05, 78.06, 78.07, 78.14

[56] References Cited

U.S. PATENT DOCUMENTS

| | | |
|---|---|---|
| 4,031,443 | 6/1977 | Droux et al. |
| 4,201,936 | 5/1980 | Roumanis ........................... 388/813 |
| 4,297,734 | 10/1981 | Laishley et al. |
| 4,775,903 | 10/1988 | Knowles |
| 4,924,160 | 5/1990 | Tung |
| 4,931,889 | 6/1990 | Osafune |
| 4,937,689 | 6/1990 | Seaver et al. |
| 4,965,501 | 10/1990 | Hashimoto |
| 4,980,876 | 12/1990 | Abate et al. |
| 4,988,933 | 1/1991 | Ogawa |
| 5,047,910 | 9/1991 | Levran et al. .................. 363/98 X |

Primary Examiner—William M. Shoop, Jr.
Assistant Examiner—Brian Sircus
Attorney, Agent, or Firm—Curtis, Morris & Safford

[57] ABSTRACT

During the deceleration portion of a seek operation, the current level provided to the actuator motor of a disk drive is based on a desired linear deceleration versus time profile that has been temporally advanced by half of a servo data position sampling interval. At each position sampling interval, a new current level is determined and maintained for the interval between samples. The actual deceleration current follows a staircase curve centered on the desired profile so as to be self-synchronizing. The current level is also adjusted to compensate for the delay between obtaining a new servo data position sample and applying a new current level to the motor.

24 Claims, 5 Drawing Sheets

| DISTANCE TO GO (TRACKS) | DESIRED VELOCITY COMMAND (TRACKS/SAMPLE) |
|---|---|
| 0.03<br>⋮ 1/16 TRACK<br>⋮ INCREMENTS<br>19.97 | 0.09<br>⋮<br>⋮<br>6.90 |
| 20.25<br>⋮ 1/2 TRACK<br>⋮ INCREMENTS<br>113.25 | 6.96<br>⋮<br>⋮<br>18.02 |

| DISTANCE TO GO (TRACKS) | FEED FORWARD COMMAND (CURRENT LEVEL) |
|---|---|
| 0.03<br>⋮ 1/16 TRACK<br>⋮ INCREMENTS<br>19.97 | 6<br>⋮<br>⋮<br>88 |

METHOD AND APPARATUS FOR SELF-SYNCHRONIZING SEEK DECELERATION

BACKGROUND OF THE INVENTION

The present invention is related to the seek deceleration operation performed in a disk drive when moving the disk head to a new track, and, more particularly to such an operation wherein the position of the head is sampled at intervals by reading servo data embedded in the tracks as the head passes thereover.

A typical disk drive includes a disk, or platter, on which data is stored using, for example, magnetic or optical storage techniques. A disk head, which reads and possibly also writes data to locations on the disk, is driven by an actuator motor, such as a "voice coil" electrodynamic motor (VCM) having a coil disposed within the magnetic field produced by a permanent magnet. The maximum acceleration and velocity of the head across the disk depends on the strength of the magnets used in the voice coil assembly, the number of windings of the coil and the amount of current flowing through the coil.

The quickest way, ideally, to move a head from one track of a disk to another is to accelerate the actuator as fast as possible for as long as possible, then, at a change-over point, to decelerate as much as possible so that the head stops exactly over the desired track. This is referred to as a "two-bang" acceleration curve, with the first "bang" being a maximum acceleration phase and the second "bang" being a maximum deceleration phase.

A description of the movement of the head across the disk may be thought of as a profile which can be expressed as a family of curves plotting acceleration, velocity or position of the disk head against position or time. The two-bang acceleration curve discussed above is a profile of acceleration versus time. Current, which is related to acceleration, is supplied to the VCM by a controller based on a profile of reference values.

In practice, the profile which would result in the ideally quickest head movement, or "seek", cannot be used, for a variety of reasons. Examples of factors difficult to predict and which affect a seek operation include the individual mechanical characteristics of the disk drive, wear over time which changes the mechanical characteristics of the disk drive, and changing environmental factors, such as a change in the supply voltage available to the motor and a change in temperature surrounding the motor. Consequently, the actual position of the head after following the ideally quickest profile may overshoot or undershoot the desired position.

To avoid overshoot, a disk deceleration operation may attempt to stop the head at a position before the desired track is reached. Since reversing the direction of movement of the disk head consumes substantially more time than moving it in its present direction a few more tracks, it is desirable to define the target stop track as being slightly ahead of the actual desired stop track.

Other techniques have been proposed to minimize the time taken during a seek operation, that is, to attempt to achieve the ideally quickest time in moving the head to a target track. One way to improve a seek operation uses the speed achieved during the acceleration portion of a seek as a factor in determining the reference speed for the deceleration portion; but this method does not address the entire problem.

Another way to improve a seek operation determines the amount of current supplied to the voice coil motor (VCM) based on a signal representing head velocity fed back to the VCM controller from a transducer or, if no transducer is available, from a velocity estimator. This method is most effective when many position samples are available and the disk drive has sufficient processing power. For example, a digital signal processor found in relatively expensive disk drives may support position and velocity sampling rates on the order of several tens of thousands to several hundreds of thousands of samples per second, whereas a microprocessor used in less expensive disk drives may support a sampling rate of only a few thousand samples per second. Thus, a less expensive disk drive may not achieve satisfactory control using only a sensed feedback technique.

A further technique to control the amount of current supplied to the VCM is based upon elaborate calculations performed in response to each position sample. But, less expensive disk drives lack the processing power to perform such elaborate calculations in the interval between samples.

To retain better control over the deceleration, it is known to use an acceleration profile including "ramps", that is, the head is gradually accelerated to its maximum velocity, remains at maximum velocity, then is gradually decelerated. However, due to practical reasons such as those mentioned above, an operating disk drive actuator is difficult to control despite the use of such a "ramped bang" profile.

Another complication arises because the profile is typically stored as a table of values, indexed by distance of the head from the target track. Specifically, this consideration makes it desirable to try to make the actual position samples of the head correspond to distances for which a value is stored, that is, to synchronize the actual samples with those samples having stored reference values. However, storing more values, such as both integral and fractional track positions, corresponding to finer position resolution, requires more memory, and results in a more expensive and larger disk drive.

OBJECTS AND SUMMARY OF THE INVENTION

Therefore, an object of the present invention is to provide a technique to decelerate the head of a disk drive during a seek operation which avoids the aforementioned disadvantages of the prior art.

Another object of the present invention is to provide a technique to decelerate a disk drive actuator which may be used with less expensive disk drives, and with disk drives exhibiting small form factors.

Yet another object of the present invention is to provide a technique for decelerating a disk drive head using a few simple calculations.

A further object of the present invention is to provide a technique to decelerate a disk drive head that automatically synchronizes the actual deceleration of the head with a reference deceleration profile.

In accordance with an aspect of the invention, a disk drive head being moved by a motor is decelerated by reading servo data from a track on a disk over which the head is passing at a predetermined sampling interval to provide a position sample, determining a current level for the motor as a function of the position sample and a reference value of a deceleration profile which is temporally advanced by one half of said sampling interval, and controlling the motor in accordance with the current level.

The above, and other objects, features and advantages of the present invention will be apparent in the following detailed description of the preferred embodiments of the present invention when read in conjunction with the accompanying drawings in which corresponding parts are identified by the same reference numeral.

DETAILED DESCRIPTION OF THE PREFERRED EMBODIMENTS

The present invention is most useful when employed with a disk having embedded servo data, that is, servo information pre-recorded at discrete locations in each track on a disk surface, such as at sector header positions. Such servo information may include typical servo burst data, useful for track following, as well as position information. In this environment, as the head is swept across the disk surface during a seek operation, samples of the position of the head are obtained by reading the servo data embedded in tracks as these tracks are crossed by the head. Each sample interval generally is equal to the time for the disk to rotate from one sector to the next (or from one servo pattern to the next) during which the head may cross several tracks.

As discussed in detail below, a high speed seek operation generally is performed only when the distance between the desired or target track and the present track exceeds a predetermined number of tracks. A seek operation includes an acceleration phase, when the head is moved at an increasing speed, and a deceleration phase, when the head is moved at a decreasing speed. A seek operation may also include a coast phase and an anticipation phase, discussed below.

During the deceleration phase, ideally, the head is decelerated according to a desired profile. A "profile" refers herein to a graphical representation of current supplied to the voice coil motor plotted against time. In practice, it is preferable to alter the deceleration of the head at discrete intervals, to simplify the control mechanism. It is convenient to match these discrete deceleration altering intervals to the position sampling intervals, so that a new deceleration command is generated for each new position sample.

Figure 1:
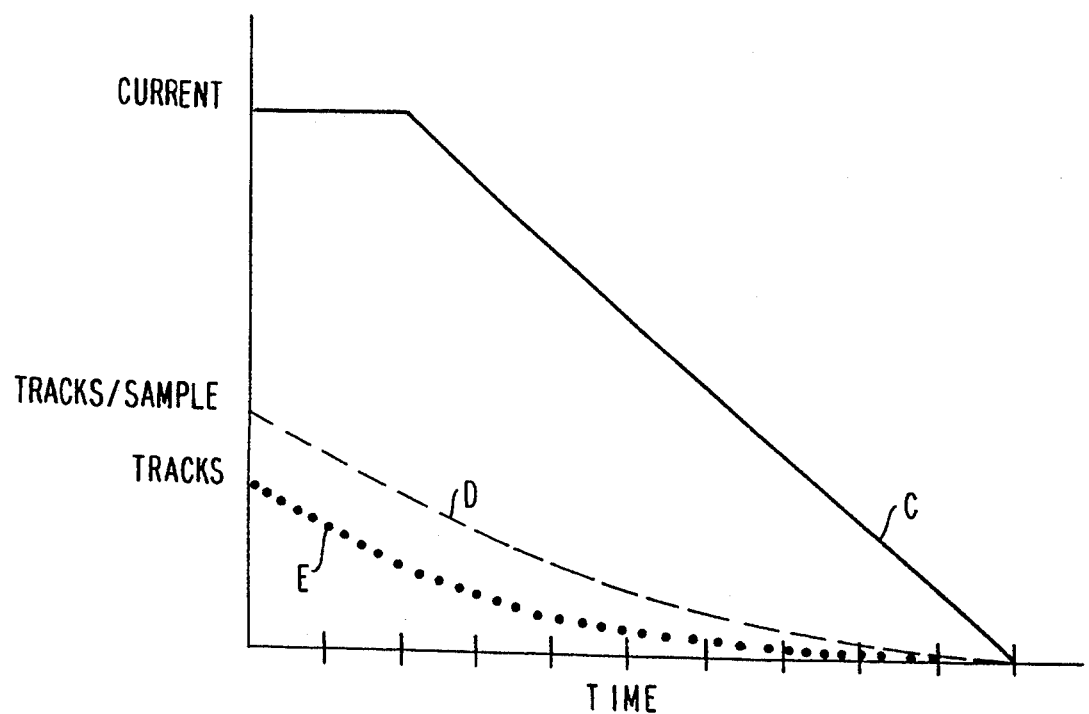
FIG. 1 is a diagram showing a deceleration profile curve according to an embodiment of the present invention.

In an advantageous embodiment of the present invention, the deceleration profile is chosen to be a linear curve having a 45° slope, shown as a solid line C in FIG. 1. The corresponding curves for velocity as a function of time and distance from target track as a function of time are respectively shown in FIG. 1 as a dashed line D and a dotted line E. A feed forward command profile is defined as the linear deceleration profile advanced in time by one half of a sample period, shown as a dashed line A in FIG. 2.

Figure 2:
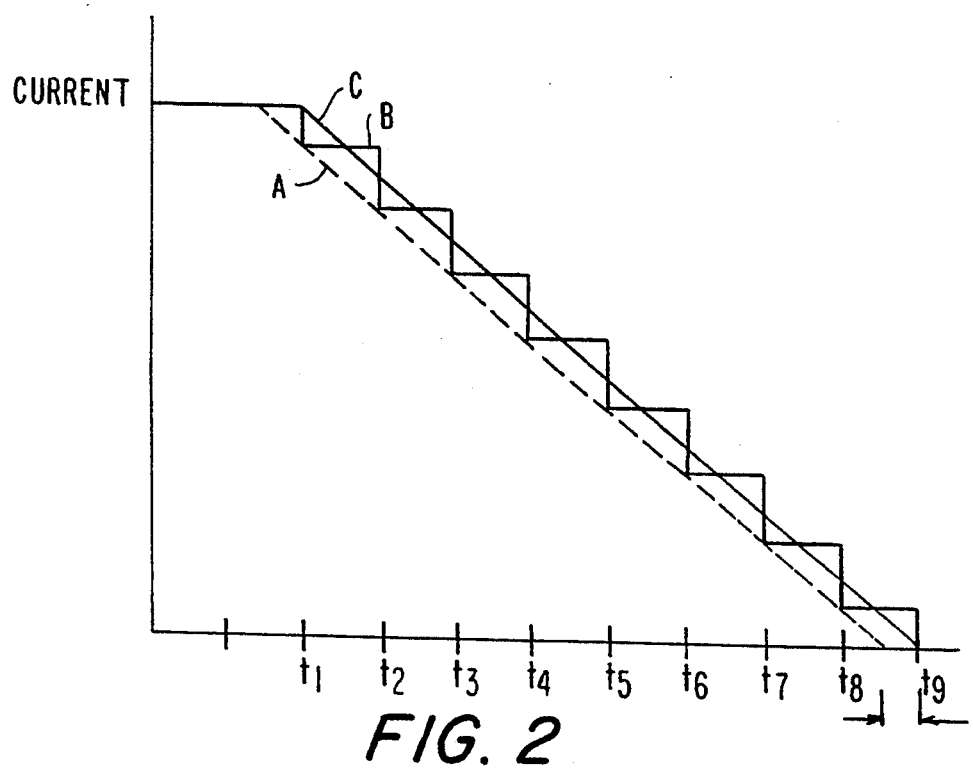
FIG. 2 is a diagram showing the deceleration profile curve of FIG. 1 and related curves.

During deceleration, at each sample interval, a new deceleration command B is calculated based on the feed forward command value, rather than the desired value. FIG. 2 shows the value of the calculated command at sample times $t_1, t_2, \ldots, t_9$ being equal to the feed forward value at these sample times, although, as described below, in practice there is a delay between obtaining a position sample and adjusting the command value due to the processing time required to determine the new command value, and, also, the calculated command value is not necessarily equal to the feed forward command value. The actual deceleration command B forms a staircase curve, centered on the desired deceleration profile C. More particularly, at time $t_1$, the value of the feed forward command is set to a certain actuator current command value, and continues until time $t_2$, when another value of the feed forward command is set as the present actuator current command value. This same operation is repeated until time $t_9$, when the head experiences no acceleration or deceleration.

The area under the staircase curve B is equal to the area under the desired deceleration curve C, thus, a seek deceleration operation controlled in this manner is self-synchronizing.

Figures 3, 5A, 5B:
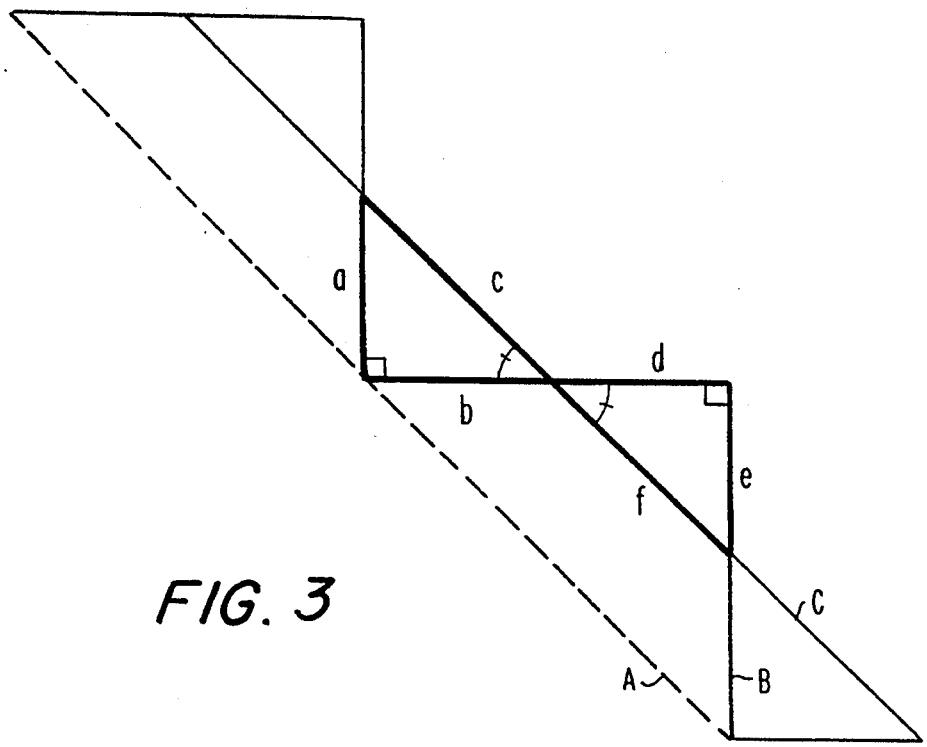
FIG. 3 shows a portion of the diagram of FIG. 2.
FIGS. 5A and 5B show lookup tables which are used to implement the curves of FIG. 2.

This self-synchronizing property may be better understood by considering the geometry of the curves A, B and C. FIG. 3 shows a portion of the desired deceleration profile C, the corresponding feed forward profile A and the resulting staircase curve B. Segments a, b and c form a triangle corresponding to when the actuator current command B is below the desired value C, while segments d, e and f form a triangle corresponding to when the actuator current command B is above the desired value C. The segments a and e are perpendicular to the segments b and d, forming respective right angles, since the deceleration command B remains at a fixed value during the sample interval corresponding to segments b and d. Since the segments b and d are parallel to each other, the segments a and e are parallel to each other. Consequently, the angle formed by the intersection of segments c and b is the same as the angle formed by the intersection of segments d and f. Of course, the remaining angles in each of the triangles, formed by the segments a,c and e,f, are also equal. Thus, the triangles above and below the desired profile C, formed by the intersection of the staircase shaped actuator current command curve B therewith, have identical angles.

Since the feed forward profile A is temporally advanced relative to the desired profile C by ½ of a sample interval, the segment b, corresponding to one half of a sample interval, is equal in length to the segment d, corresponding to the other half of the sample interval. Consequently, the lengths of segments a and e, and segments c and f are also equal to each other, that is, the triangles have equal area.

Furthermore, it will be readily appreciated that the present invention does not require the sampling intervals to have a synchronized relationship with any particular point on the desired profile C in order to be self-synchronizing. In other words, the sampling interval used during a seek operation may be offset from the sampling interval used to create the desired profile C and the feed forward profile A, as long as their durations are equal, which ensures that segment b is the same length as segment d. Therefore, a disk drive according to the present invention may employ relatively simple adjustment calculations, since these calculations need not compensate for lack of synchronization between the profile and actual sampling intervals.

Also, the slope of the desired profile need not be restricted to 45°, and may be freely chosen, in view of the aforementioned geometry.

Advantages of the present invention further include more accurate velocity control and faster track seeks relative to conventional seek methods.

Additionally, since the computational burden of decelerating according to the present invention is fairly light, the sophistication required in the controller (microprocessor or digital signal processor) for the disk drive VCM is reduced.

Still further advantages of decelerating according to the present invention are reduction of mechanical wear on the disk drive and quieter operation, since the magnitude of the stress on the disk drive mechanism due to absorbing movement energy is lowered. That is, the self-synchronizing property of the present invention sheds movement energy evenly over time, so that the peak electromechanical stimulus experienced by the disk drive is smaller, corresponding to quieter operation and reduced excitation of mechanical resonances. This can be seen in that the triangles formed by the actual current command and the desired current command have approximately equal area, rather than being of varying areas.

A disk drive using the present invention will now be described.

Figure 4:
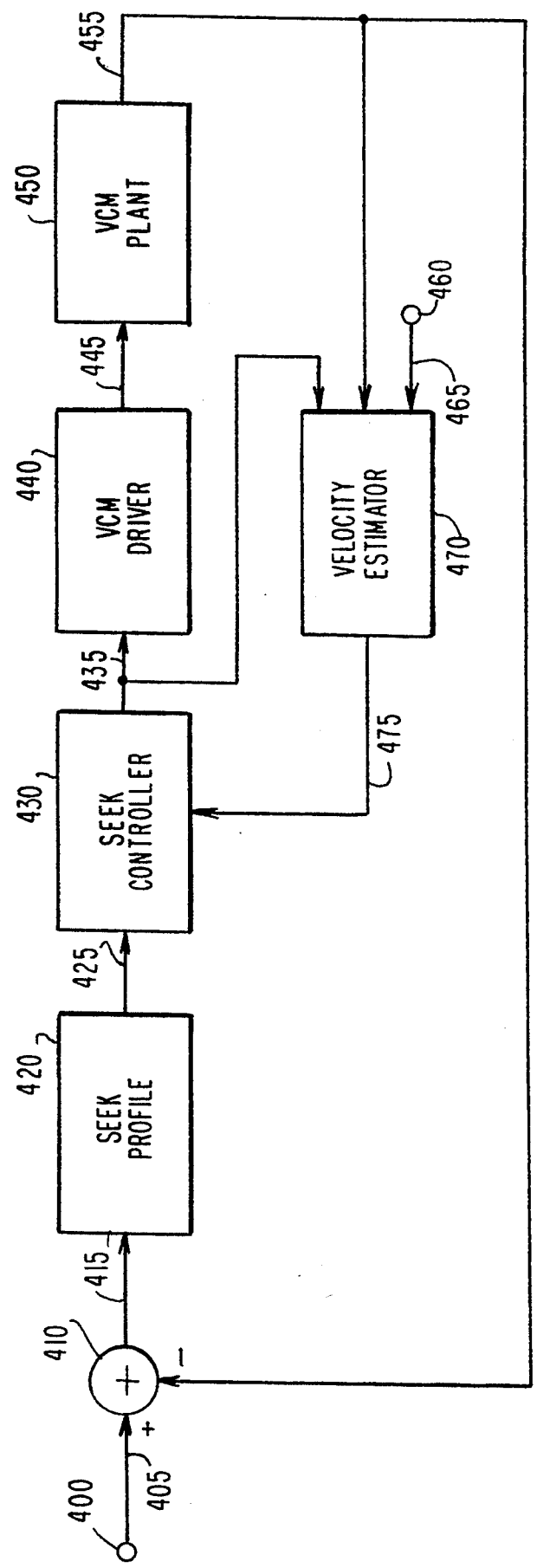
FIG. 4 is a block diagram of a portion of a disk drive using an embodiment of the present invention.

The portion of the disk drive most relevant to the seek operation is shown in the block diagram of FIG. 4. An "external" microprocessor or digital signal processor in the disk drive is also used to implement the seek operation, but is not shown to simplify the illustration. The apparatus shown in FIG. 4 includes input terminals 400 and 460, subtractor 410, seek profile command generator 420, seek controller 430, voice coil motor (VCM) driver 440, VCM 450 and velocity estimator 470.

The target track, that is, the track into which data is to be written or from which data is to be read, is supplied as a target track signal 405 to subtractor 410 via input terminal 400. Also, a present position signal 455 based on the embedded servo data most recently read from the disk is supplied to subtractor 410. The present position signal 455 is subtracted from the target track signal 405 by subtractor 410 to produce a distance-to-go signal 415 which is supplied to seek profile command generator 420.

Seek profile command generator 420 uses the distance-to-go signal 415 as a lookup index for each of two tables contained therein. The first table, shown schematically in FIG. 5A, provides a desired velocity command value, from the profile shown in FIG. 1, for various distances from the target track. The second table, shown schematically in FIG. 5B, provides a feed forward command value, from the feed forward profile A shown in FIG. 2, for various distances from the target track.

More specifically, the desired velocity command is stored with a fine resolution of track position for short distances from the target track, and is stored with a coarser resolution of track position for longer distances from the target track. For example, as shown in FIG. 5A, when the head is within 20 tracks of the target track, the desired velocity command, expressed in units of tracks/sample where sample is actually the sampling interval, may be stored to the nearest 1/16 track, while when the head is between 20 tracks from the target track and the changeover point (which, for example, may be 113 tracks therefrom), the desired velocity command may be stored to the nearest ½ track.

Similarly, the feed forward command data is stored at a fine resolution of track position for short distances from the target track, such as less than 20 tracks from the target track. For longer distances, such as lengths between the changeover point and 20 tracks from the target track, a constant deceleration current command value, representing a predetermined constant deceleration, may be used as the feed forward current command. The number stored as the feed forward command actually represents one of a range of levels, such as 256 levels, which are then converted into a current signal, as explained below.

For example, 128 levels may be used to represent positive current values, and 128 levels may be used to represent negative current values. As shown in FIG. 5B, when the distance from the target track is 0.03 tracks, the feed forward command may be "6", indicating 6/128 of the actuator current magnitude in the positive direction; while, when the head is far from the target track, the feed forward current command may be the constant deceleration current command, that is, a value of "88", indicating 88/128 of the actuator current magnitude.

The electromechanical properties of the disk drive determine the nominal constant deceleration command value, which is then derated by a safety derating factor, yielding the practical maximum constant deceleration value. For example, the nominal constant deceleration command value may be 104/128 of the current magnitude that can be supplied to the actuator motor, and the chosen derating factor may be 85%, yielding a constant deceleration current command value of $(0.85)(104) = 88$.

Upon the occurrence of a sample time, that is, when the disk has rotated so as to make embedded servo data available to be read by the head, the actual (i.e., calculated or estimated) distance to go is used to access the feed forward command value, which is used to drive the actuator current until the next sample time, in combination with a velocity error value, defined below.

Generator 420 provides the appropriate desired velocity command and feed forward command as a parameter signal 425 supplied to seek controller 430.

Seek controller 430 receives the parameter signal 425 and a velocity signal from velocity estimator 475, and produces therefrom a VCM command signal 435 supplied to VCM driver 440. The operation of seek controller 430 is further explained below.

The VCM driver 440 may comprise an eight bit latch circuit, a digital to analog (D/A) converter and a transconductance amplifier, connected in series. The VCM command signal 435, which may be a TTL level digital signal representing eight bits, is supplied to the latch circuit, which is adapted to hold the received data. Upon receiving a fixed delay trigger pulse from the external microprocessor or digital signal processor, the latch circuit applies the data held therein to the D/A converter. In one embodiment, each eight bit command signal identifies one of 256 levels, corresponding to a range of $+1.34$ volts to $-1.34$ volts, so that the D/A converter may be characterized as having a gain of $(2)(1.34 \text{ v})/256 = 10.4$ mvolts/bit. The D/A converter produces an output voltage supplied to the transconductance amplifier, which amplifies the signal presented thereto using a gain such as 0.167 amps/volt, and provides an output current having a range of +223 milliamperes (mA) to −223 mA as a driving signal 445 to drive the VCM 450. The VCM driver 440 may comprise a SGS-Thomson "5 volt Hard Disk Drive Power Combo" circuit model L6245.

The result of movement of the VCM 450 is that the head crosses tracks on the disk and reads embedded servo data, supplied as the present position signal 455 to subtractor 410 and velocity estimator 470.

Although only actual position samples are represented via the present position signal 455, and not actual velocity samples since present disk drives lack velocity measuring devices, the velocity of the head is estimated by velocity estimator 470 as a function of the position samples and the time durations between samples to generate an estimated velocity, sometimes referred to herein as the "actual velocity". The velocity estimator 470 also includes the effect of externally induced torque which must be overcome by the VCM, due to, among other factors, pressure from the spinning disk ("windage") and pressure from a flexible circuit which maintains electrical contact with the actuator while the actuator is moving. A bias value, representing the externally induced torque, is supplied as a bias signal 465 from a suitable source (not shown) through input terminal 460. The estimated velocity is supplied as the velocity signal 475 to seek controller 430.

A seek operation performed by a disk drive using the present invention will now be described.

Prior to the seek operation, the disk drive is assumed to be in track following mode, in which the disk head is controlled to be over a particular track by a control operation executed in the seek controller 430 (or other circuitry provided for carrying out a track following operation) at every sample interval, which may be, for example, 346.37 μsec, that is, about 3000 times per second.

At some time, a data processing device, to which the disk drive using the present invention is coupled, issues a seek command. The preparatory processing shown in the flow chart of FIG. 6 now occurs.

At step 610, the controller determines whether the target track is equal to the present track, that is, the track at which the head presently is located. If it is, there is no need for a seek operation, and the control routine branches back to the track following mode, shown as step 620.

However, as shown at step 630, if the target track differs from the present track, the direction of movement of the head toward the target track is determined and values adjusted accordingly. For example, a positive value may indicate movement towards the inner diameter of the disk, whereas a negative value may indicate movement towards the outer diameter of the disk. More specifically, the velocity and VCM commands are among the values adjusted so as to reflect the desired direction.

Figure 6:
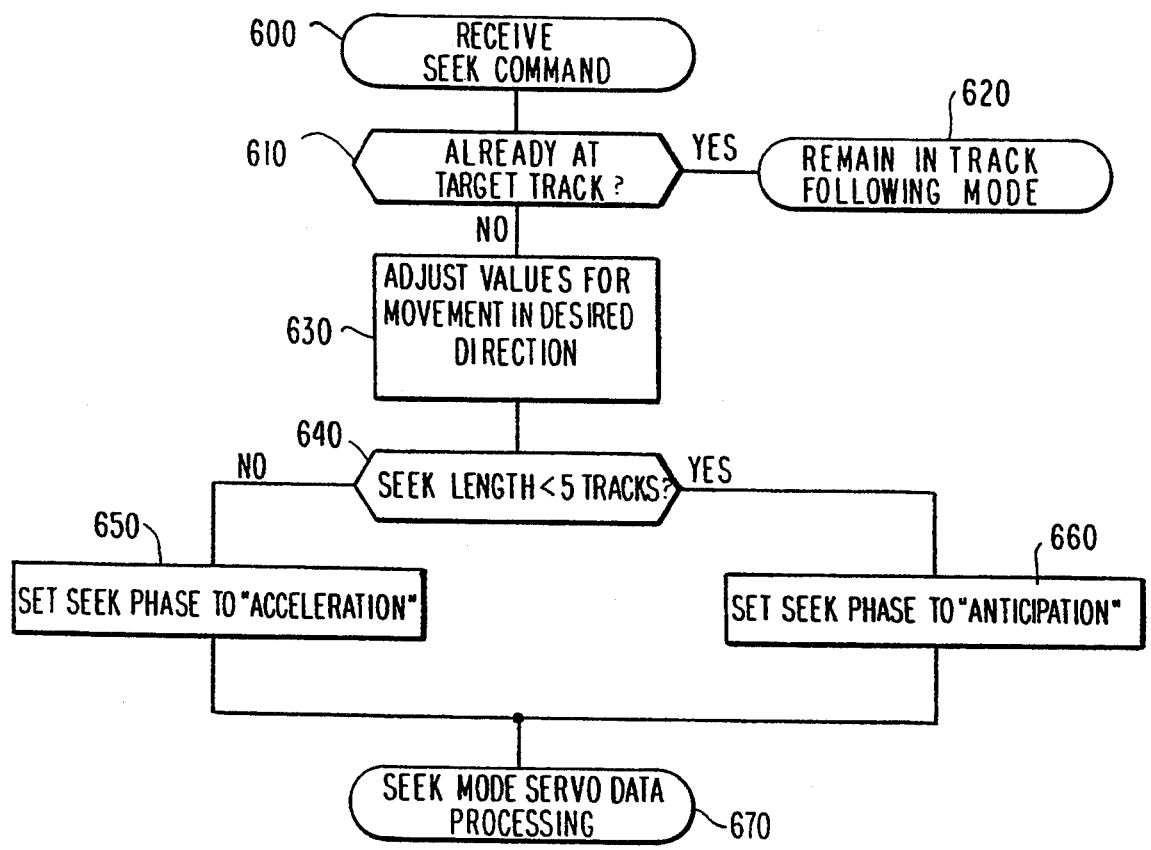
FIGS. 6 and 7 are flowcharts used in explaining a seek operation employing an embodiment of the present invention.

At step 640, it is determined whether the seek length, i.e., distance-to-go to target track, is long by comparing it to a predetermined threshold, shown, for example, as five tracks in FIG. 6.

If the seek length is long, at step 650, the present seek phase is set to Acceleration, whereas if the seek length is short, at step 660, the present seek phase is set to Anticipation. This concludes the majority of the preparatory processing, and, as shown at step 670, the control routine now advances to a seek mode servo data processing routine which occurs in response to the receipt of a new servo data sample read from the disk.

Figure 7:
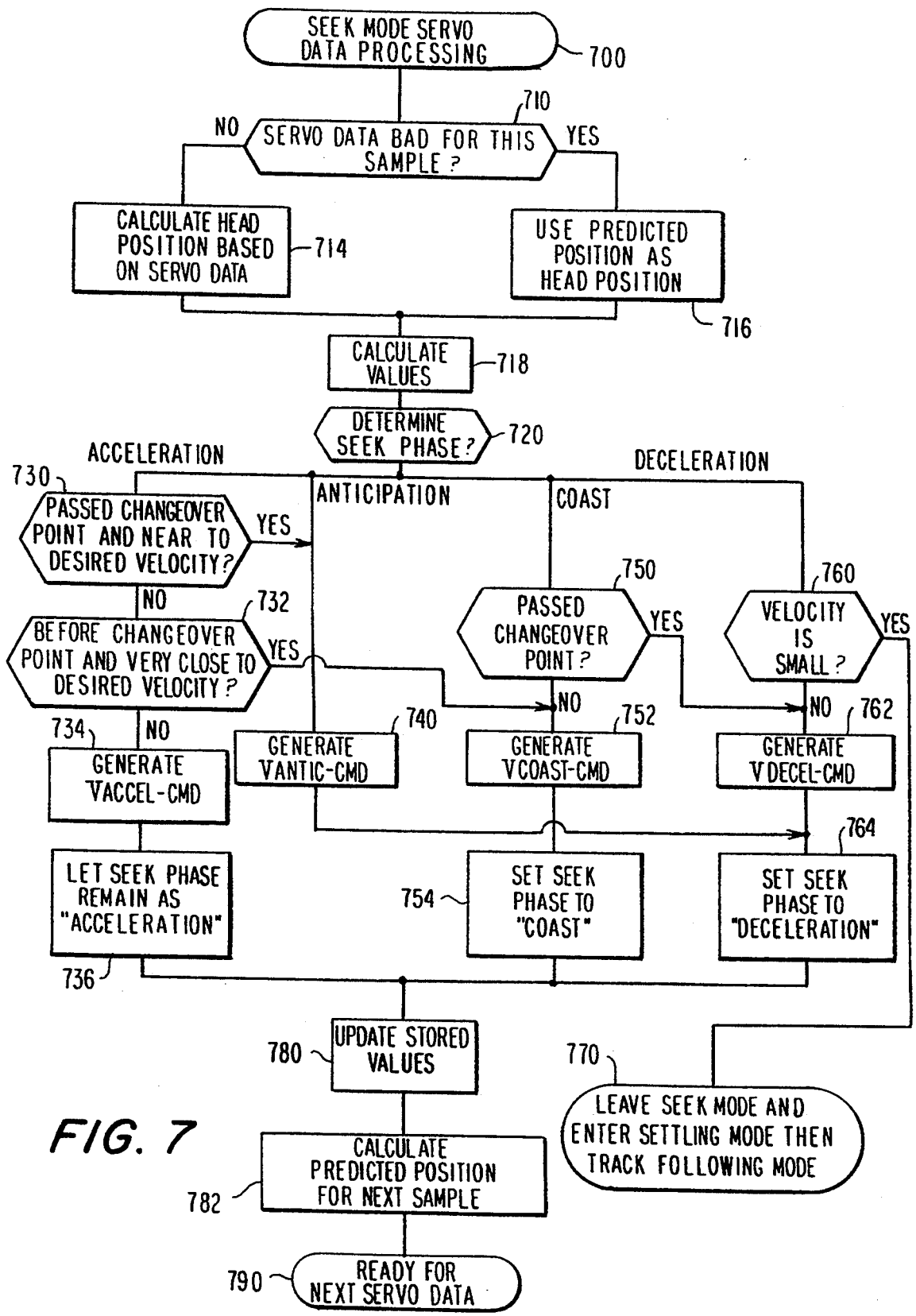

The seek mode servo data processing routine is shown in FIG. 7. Initially, as shown at step 710, inquiry is made as to whether the sampled servo data represents usable information. If it does, as shown at step 714, the servo data is used to calculate the head position. If the servo data is not usable, then, as shown at step 716, a previously predicted head position is used instead of a calculated head position. Initially, the present position is used as the predicted head position, and thereafter, the predicted head position is determined at the end of each servo data processing routine, as shown at step 782.

After the present head position is obtained, from either the sampled servo data or the predicted position, certain values for the present iteration of the servo data processing routine are calculated, as shown at step 718. These values include the present velocity, based on the velocity signal 475 of FIG. 4; the delayed predicted position X1DEL at which the head will be located, after the time consumed in the servo data processing routine, and when the VCM command signal 435 of FIG. 4 is generated; the delayed predicted velocity VELDEL at which the head will be moving, determined from the VCM command which is produced in accordance with the deceleration profile; and the velocity error. The delayed predicted position is defined as:

$$X1DEL = \Delta X - KE1 \cdot X2 - G8 \cdot (u(k-1) - BIAS)$$

and the delayed predicted velocity is defined as:

$$VELDEL = X2 + G2 \cdot (u(k-1) - BIAS)$$

where,
$\Delta X$ = distance to go to target track
$KE1 = (1-m)$ $$m = \frac{(\text{sample rate} - \text{sample-to-correction delay})}{\text{sample rate}}$$

sample-to-correction delay = the inherent delay between the time that servo data is sampled and the time that the VCM command issues
$X2$ = estimated velocity from velocity estimator 470
$G8 = (G1 \cdot (1-m)^2 \cdot (1-m^2))/2$
$G1$ = acceleration constant
$u(k-1)$ = prior VCM command
$BIAS$ = value provided at input terminal 460
$G2 = G1 \cdot (1-m)$ It will be appreciated that controller 430 may be formed as a microprocessor or digital signal processor fully capable of carrying out the mathematical operations for calculating X1DEL and VELDEL.

The acceleration constant G1 characterizes various influences, including the internal torque Kt caused by current applied to the actuator motor, to be distinguished from the externally induced torque represented by the value BIAS. More specifically, the acceleration constant G1 may be determined as:

$$G1 = \frac{Kt \cdot r \cdot Kda \cdot Kpa \cdot TPI \cdot Tsamp^2}{J}$$

$$G1 = 0.01688 \text{ tracks/(bit-sample}^2)$$

where,

Kt=torque constant=0.029 (N−m)/ampere
r=pivot radius of disk drive=1.3996 inch
Kda=D/A gain=0.01043 volt/bit
Kpa=transconductance amp gain=0.166667 amperes/volt
TPI=track density=2002 tracks/inch
Tsamp=sampling period=346.367 μsec
J=inertia=1.004·10−6 Kg−m²

Both the delayed predicted position and delayed predicted velocity are, as can be seen, interpolated values which provide indications of position and velocity of the head. Thus, sampling at discrete linear times gives a reasonably accurate representation of the track at which the head is located, despite the restriction that actual data is available only at the discrete sampling intervals. In other words, since the actual velocity determination is only valid at the sample time, the controller 430 must account for the change in velocity and the change in position from the time the sample was taken to when the correction (control output) is applied, and this is done by interpolation.

The delay between reading a servo data sample and applying a new VCM current command is assured to be a fixed amount through use of the latch circuit in the VCM driver 440. Reading of a new servo data sample sets a timer in the external microprocessor or digital signal processor. When the timer indicates the end of a predetermined time period, the external microprocessor or digital signal processor supplies the fixed delay trigger pulse to the latch circuit of VCM driver 440, causing the latch circuit to release the data held therein to the D/A converter of VCM driver 440, as described above.

The velocity error is defined as the difference between the profile velocity, from seek profile command generator 420 and which is accessed with the delayed predicted position, and the delayed predicted velocity VELDEL.

Then, as shown at step 720, inquiry is made to determine which phase of the seek is presently occurring. Initially, the phase will be either Acceleration, set at step 650, or Anticipation, set at step 660. However, at an intermediate point of the seek operation, the phase may be either Acceleration, Coast or Deceleration, as will be explained.

If the seek operation is presently in the Acceleration phase, as shown at step 730, a test is performed as to whether the changeover point has been passed. That is, based on the mechanical characteristics of the disk drive mechanism, it is possible to determine the distance from the target track at which deceleration must begin to ensure that complete deceleration occurs by the time the target track is reached. This distance is referred to as the changeover point.

If the changeover point has been passed and the actual velocity is near to the desired velocity, then the phase of the seek operation is changed to Anticipation, and the routine advances to step 740. However, if the present position is before the changeover point and the disk head is very close to its desired velocity, which is approximately the maximum velocity at which it will be operated, then additional acceleration is not necessary, and the seek operation routine is changed to Coast and advances to step 752.

Experimentally, it has been found that, for inquiry 730, "near to" is advantageously expressed as a difference between the desired and actual velocity of less than 8 tracks/sample, and preferably 4 tracks/sample, while for inquiry 732, "very close to" is advantageously expressed as a difference between the desired and actual velocity of less than 4 tracks/sample, and preferably 2 tracks/sample. These tests, that is, checking whether the actual velocity is in the neighborhood of the desired velocity, quantitatively express whether it is worthwhile to accelerate for another sample. Generally, if the actual and desired velocities are close, it is better to proceed to the next phase of the seek, while, if the actual and desired velocities are farther apart, it is worthwhile to continue to accelerate. Before entering the Coast phase, it is highly desirable to be very close to the maximum acceleration, and so a small difference of 2 tracks/sample must exist between the desired and actual velocities, reflecting that additional acceleration is usually desirable. Before entering the Anticipation phase, a "looser" difference, that is 4 tracks/sample, has been found to give good results, attributed to the nature of the Anticipation phase, discussed below.

If inquiry 732 is answered in the negative, for example, if the maximum velocity has not been reached, step 734 is carried out and the seek controller 430, shown in FIG. 4, generates a constant acceleration command for the current through the voice coil motor, Vaccel-cmd, for example, a current of 180 mA, supplied as the VCM command signal 435. A flag value is set, as shown at step 736, to indicate that the controller 430 is in the Acceleration phase.

If the seek operation is presently in the Anticipation phase, for example, if inquiry 730 is answered in the affirmative, then as shown at step 740, the seek controller 430 generates an anticipation command for the current through the VCM, Vantic-cmd, defined as:

$$Vantic\text{-}cmd = G7 \cdot (profile\text{-}velocity - actual\text{-}velocity)$$

with $$G7 = \frac{1}{(G1 \cdot (1 + 1/KTder))}$$

$$G7 = 27.2 \text{ bits-sample/track}$$

where profile-velocity is read from the lookup table of FIG. 5A, and KTder is a derating factor which represents operating the disk drive at, for example, 85% of its nominal electromechanical characteristics. An advantage of calculating Vantic-cmd according to this equation is that the calculation can be performed very quickly, since it is a relatively simple equation.

The objective of the Anticipation phase is to make the actual velocity equal to the desired velocity, that is, to the profile velocity, over one sample period. The effect of the Anticipation phase is to reduce an initial overshoot which occurs at the start of the following Deceleration phase. Reduction in the initial overshoot of the Deceleration phase reduces the time required to compensate for this overshoot during the Deceleration phase, and improves the accuracy of a short seek operation. That is, the time to compensate for initial overshoot required by the closed loop control technique used during the Deceleration phase increases with an increase in the amount of initial overshoot, so, for a short seek, it is beneficial to reduce the amount of initial overshoot. As explained below, one of the terms defining the current command during the Deceleration phase is a constant, KVEL, times the difference between the profile velocity and the actual velocity. The Anticipation phase reduces this difference, thus reducing the amount of initial overshoot.

Since the duration of the Anticipation phase is one sample period, a flag value is set, as shown at step 764, so that the controller 430 enters the Deceleration phase at the next servo data sample processing interval.

If the seek operation is presently in the Coast phase, inquiry 750 is made to determine whether the changeover point has been passed, similar to inquiry 730. If the changeover point has been passed, the phase of the seek operation is changed to Deceleration and the routine advances to step 762.

If the changeover point has not been passed, the Coast phase, shown at step 752 is carried out and the seek controller 430 generates a coast command for the current through the VCM, Vcoast-cmd, defined as:

$$Vcoast\text{-}cmd = KVEL \cdot (coast\text{-}velocity - actual\text{-}velocity) - BIAS$$

The gain KVEL is chosen assuming that the actual velocity is close to the desired velocity "coast-velocity", and may be a value of 56 bits-sample/track. A value for the parameter "coastvelocity" is chosen based on the mechanical properties of the disk drive and the processing properties of controller 430, and may be, for example, 18 tracks/sample. As shown at step 754, a flag is set to indicate that the controller is in the Coast phase.

If instruction 720 determines that the seek operation is presently in the Deceleration phase, inquiry 760 determines whether the velocity of the head is small, such as below a velocity of 0.05, that is, 1/20, tracks per sample. If so, the controller leaves the seek mode and enters the track following mode, as represented by instruction 770.

However, if inquiry 760 in the Deceleration phase is answered in the negative, the seek controller 430 generates a deceleration command for the current supplied to the VCM. This command Vdecel-cmd is defined as:

$$Vdecel\text{-}cmd = KVEL \cdot (profile\text{-}velocity - actual\text{-}velocity) - feed\text{-}fwd\text{-}cmd - BIAS$$

where feed-fwd-cmd is read from the lookup table of FIG. 5B. For a long seek, the Deceleration phase begins approximately at the changeover point, with the parameter feed-fwd-cmd having the value of the constant deceleration current command. At a particular distance from the target track, it is necessary to reduce the magnitude of the feed forward command so that the head has an acceleration (deceleration) of zero at the target track. This particular distance may be chosen to be about 16 tracks from the target track, corresponding to 8 servo data sampling intervals. As shown in FIGS. 5A and 5B, the desired velocity and feed-fwd-cmd are expressed with fine granularity beginning approximately 20 tracks from the target track, accommodating the choice of 16 tracks discussed above. After Vdecel-cmd is generated, the routine advances to instruction 764 to set a flag value indicating that controller 430 is in the Deceleration phase.

After an acceleration, coast or deceleration flag is set indicating the phase of the seek operation as determined by one of steps 736, 754 and 764, the stored values are updated in preparation for receipt of the next servo data sample, as shown at step 780. This updating includes changing the values for "present" to "prior", such as the VCM command u(k−1), the distance to go to target track AX, and the estimated velocity X2. Then instruction 782 is executed to calculate a predicted position, which will be used at step 716 as an actual position representation if the next servo sample read from the disk is unusable. As indicated at step 790, the controller 430 waits until the next servo data sample is read, and then advances to step 710.

Although the present invention has been described in terms of a linear deceleration profile, a curved profile may also be used, with suitable corrections so as to ensure that the actual profile followed by the disk head forms a curve having the same area thereunder as the area under the desired profile curve.

Although an illustrative embodiment of the present invention, and various modifications thereof, have been described in detail herein with reference to the accompanying drawings, it is to be understood that the invention is not limited to this precise embodiment and the described modifications, and that various changes and further modifications may be effected therein by one skilled in the art without departing from the scope or spirit of the invention as defined in the appended claims.

What is claimed is:

1. A method for decelerating a disk drive head being moved by a motor, comprising the steps of:

reading servo data from a track on a disk over which said head is passing at a predetermined sampling interval to provide a position sample, determining a deceleration current level for said motor as a function of the position sample and a reference value of a feed-forward profile which is temporally advanced by one half of said sampling interval relative to a desired deceleration profile, and controlling said motor in accordance with said deceleration current level.

2. The method of claim 1, wherein said desired deceleration profile is linear with time.

3. The method of claim 1, wherein said step of controlling maintains the current level of said motor at a substantially constant value until said deceleration current level is determined.

4. The method of claim 3, wherein the current level of said motor varies with time during said decelerating of said head in accordance with a staircase-shaped curve centered on said desired deceleration profile.

5. The method of claim 1, wherein said step of determining adjusts said deceleration current level for a delay between when said servo data is read and when said motor is controlled in accordance with said deceleration current level.

6. The method of claim 5, wherein said step of determining determines said deceleration current level as a function of a delayed predicted position X1DEL at which said head will be located when said motor is controlled in accordance with said deceleration current level, said delayed predicted position X1DEL being defined as:

$$X1DEL = \Delta X - KE1 \cdot X2 = G8 \cdot (u(k-1) - BIAS)$$

where, $\Delta X$ = the difference between said position sample and a target position, $KE1 = (1 - m)$, m = (sample rate − sample-to-correction delay)/sample rate, sample-to-correction delay=the inherent delay between when said servo data is read and when said motor is controlled in accordance with said deceleration current level, X2=an estimated velocity, $G8=(G1\cdot(1-m)^2\cdot(1-m^2))/2$, G1=an acceleration constant, u(k−1)=the current level presently being used to control said motor, and BIAS=a predetermined value.

7. The method of claim 5, wherein said step of determining determines said deceleration current level as a function of a delayed predicted velocity VELDEL at which said head will be moving when said motor is controlled in accordance with said deceleration current level, said delayed predicted velocity VELDEL being defined as:

$$VELDEL = X2 + G2\cdot(u(k-1) - BIAS)$$

where,

X2=an estimated velocity,

G2=G1·(1−m),

G1=an acceleration constant, m=(sample rate−sample-to-correction delay)/sample rate, sample-to-correction delay=the inherent delay between when said servo data is read and when said motor is controlled in accordance with said deceleration current level, u(k−1)=the current level presently being used to control said motor, and BIAS=a predetermined value.

8. The method of claim 5, further comprising the step of holding said deceleration current level until a fixed time period after said servo data is read, and wherein said motor is controlled in accordance with said deceleration current level beginning at said fixed time period after said servo data is read.

9. A method for decelerating a disk drive head being moved by a motor, comprising the steps of:

reading servo data from a track on a disk over which said head is passing at a predetermined sampling interval to provide a position sample, determining an anticipation current level for said motor as a function of the position sample, a reference value of a desired velocity profile, and an actual velocity of said head, controlling said motor in accordance with said anticipation current level, determining a deceleration current level for said motor as a function of the position sample and a reference value of a feed-forward profile which is temporally advanced by one half of said sampling interval relative to a desired deceleration profile, and controlling said motor in accordance with said deceleration current level.

10. The method of claim 9, further comprising the steps of controlling said motor in accordance with a predetermined acceleration current level, and checking whether said actual velocity of said head is near to a reference value of said desired velocity profile before said step of determining an anticipation current level.

11. The method of claim 1, further comprising the steps of determining a coast current level for said motor as a function of the position sample, a predetermined coast velocity value, and an actual velocity of said head; and controlling said motor in accordance with said coast current level before said step of determining said deceleration current level.

12. The method of claim 11, further comprising the steps of controlling said motor in accordance with a predetermined acceleration current level, and checking whether said actual velocity of said head differs from a reference value of a desired velocity profile by no more than 4 tracks/sample position before said step of determining a coast current level.

13. An apparatus for decelerating a disk drive head being moved by a motor, comprising:

means for reading servo data from a track on a disk over which said head is passing at a predetermined sampling interval to provide a position sample, means for determining a deceleration current level for said motor as a function of the position sample and a reference value of a feed-forward profile which is temporally advanced by one half of said sampling interval relative to a desired deceleration profile, and means for controlling said motor in accordance with said deceleration current level.

14. The apparatus of claim 13, wherein said desired deceleration profile is linear with time.

15. The apparatus of claim 13, wherein said means for controlling maintains the current level of said motor at a substantially constant value until said deceleration current level is determined.

16. The apparatus of claim 15, wherein the current level of said motor varies with time during said decelerating of said head in accordance with a staircase-shaped curve centered on said desired deceleration profile.

17. The apparatus of claim 13, wherein said means for determining adjusts said deceleration current level for a delay between when said servo data is read and when said motor is controlled in accordance with said deceleration current level.

18. The apparatus of claim 17, wherein said means for determining determines said deceleration current level as a function of a delayed predicted position X1DEL at which said head will be located when said motor is controlled in accordance with said deceleration current level, said delayed predicted position X1DEL being defined as:

$$X1DEL = \Delta X - KE1\cdot X2 - G8\cdot(u(k-1) - BIAS)$$

where,

ΔX=the difference between said position sample and a target position,

KE1=(1−m), m=(sample rate−sample-to-correction delay)/sample rate, sample-to-correction delay=the inherent delay between when said servo data is read and when said motor is controlled in accordance with said deceleration current level, X2=an estimated velocity, $G8=(G1\cdot(1-m)^2\cdot(1-m^2))/2$, G1=an acceleration constant, u(k−1)=the current level presently being used to control said motor, and BIAS=a predetermined value.

19. The apparatus of claim 17, wherein said means for determining determines said deceleration current level as a function of a delayed predicted velocity VELDEL at which said head will be moving when said motor is controlled in accordance with said deceleration current level, said delayed predicted velocity VELDEL being defined as:

$$VELDEL = X2 + G2 \cdot (u(k-1) - BIAS)$$

where,
- X2 = an estimated velocity,
- G2 = G1·(1−m),
- G1 = an acceleration constant,
- m = (sample rate − sample-to-correction delay)/sample rate,
- sample-to-correction delay = the inherent delay between when said servo data is read and when said motor is controlled in accordance with said deceleration current level,
- u(k−1) = the current level presently being used to control said motor, and
- BIAS = a predetermined value.

20. The apparatus of claim 17, further comprising means for holding said deceleration current level until a fixed time period after said servo data is read, and wherein said motor is controlled in accordance with said deceleration current level beginning at said fixed time period after said servo data is read.

21. An apparatus for decelerating a disk drive head being moved by motor, comprising:

means for reading servo data from a track on a disk over which said head is passing at a predetermined sampling interval to provide a position sample, means for determining an anticipation current level for said motor as a function of the position sample, a reference value of a desired velocity profile, and an actual velocity of said head, means for determining a deceleration current level for said motor as a function of the position sample and a reference value of a feed-forward profile which is temporally advanced by one half of said sampling interval relative to a desired deceleration profile, and means for controlling said motor in accordance with said anticipation current level or said deceleration current level.

22. The apparatus of claim 21, further comprising means for controlling said motor in accordance with a predetermined acceleration current level, and means for checking whether said actual velocity of said head is near to a reference value of said desired velocity profile.

23. The apparatus of claim 13, further comprising means for determining a coast current level for said motor as a function of the position sample, a predetermined coast velocity value, and an actual velocity of said head; and means for controlling said motor in accordance with said coast current level.

24. The apparatus of claim 23, further comprising means for controlling said motor in accordance with a predetermined acceleration current level, and means for checking whether said actual velocity of said head differs a reference value of a desired velocity profile by no more than about 4 tracks/position sample.

* * * * *

UNITED STATES PATENT AND TRADEMARK OFFICE
CERTIFICATE OF CORRECTION

PATENT NO. : 5,343,131
DATED : August 30, 1994
INVENTOR(S) : Todd D. Baumann

It is certified that error appears in the above-indentified patent and that said Letters Patent is hereby corrected as shown below:

Claim 6, line 8, column 12, line 61, correct the equation to read as follows:

```
X1DEL = ΔX - KE1 · X2 - G8 · (u(k-1) - BIAS)
```

Signed and Sealed this

Twenty-fifth Day of October, 1994

Attest:

BRUCE LEHMAN

*Attesting Officer*          *Commissioner of Patents and Trademarks*